Patented Feb. 25, 1941

2,232,785

UNITED STATES PATENT OFFICE 2,232,785

PREPARATION OF LOW MOLECULAR WEIGHT POLYMERS OF VINYLIDENE COMPOUNDS

Benjamin W. Howk, Wilmington, Del., assignor to E. I. du Pont de Nemours & Company, Wilmington, Del., a corporation of Delaware No Drawing. Application December 20, 1938, Serial No. 246,832

11 Claims. (Cl. 260—464)

This invention relates to a process for the preparation of low molecular weight polymeric materials, and more particularly it relates to a process for the progressive polymerization of compounds having the general formula:

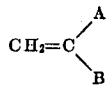

where "A" is hydrogen, an alkyl radical, or an aryl radical, and "B" is a radical selected from the group consisting of cyano, acyl, acyloxy, carboalkoxy, and carboaryloxy radicals. Compounds of the above type in which A and B have the indicated meanings will be referred to hereinafter and in the claims as vinylidene compounds. More specifically, this invention relates to a process for the conversion of polymerizable compounds of the type represented by methyl methacrylate, n-butyl methacrylate, acrylonitrile, methacrylonitrile, methyl vinyl ketone, vinyl acetate, and the like to low polymers having a molecular weight from 2 to about 6 or 8 times that of the original monomer.

The conventional methods for polymerizing vinylidene compounds of the aforementioned type involve the use of moderate temperatures, usually below 100° C., in combination with active catalysts such as metallic and metalloid halides or organic peroxides. Moreover, it is well known that auto-oxidation will oftentimes produce small amounts of active peroxides in monomeric compounds on standing in contact with air, which may result in spontaneous polymerization even at low temperatures. This has led to the common commercial practice of adding to a freshly prepared monometer a small amount of stabilizing substance, usually an antioxidant, that serves to inhibit polymerization and preserve the monomer essentially unchanged over long periods at low temperatures. Very low inhibitor concentrations of the order of 20 parts per million by weight will produce this effect. However, on subjecting a monometer of the type mentioned above to optimum polymerizing conditions in the presence of an organic peroxide catalyst, the effect of the stabilizer becomes negligible and polymerization occurs rapidly and completely to give more or less transparent, solid resinous products. These materials may vary widely in molecular weight from about 2000 up to a maximum of several hundred thousand, and they have been arbitrarily classified by Staudinger (Trans. Faraday Soc., 32, 101 (1936)) as hemi- or eucolloidal materials depending on whether the molecular weight is below or above 10,000. All of them, however, are characterized by definite colloidal properties in solution and by the fact that products having a definite chemical composition have seldom if ever been separated from them. In general, studies relating to the mechanism of the formation of polymers coming within this category have led to the conclusion that they are produced by chain-type reactions that occur rapidly after a brief initial induction period required for the development of activated centers. In reactions of this type the products are almost invariably high molecular weight polymers, which accounts for the fact that the formation of low molecular weight liquid polymers of analogous structure, such as the dimer and trimer, has seldom if ever been observed to occur simultaneously. In certain isolated cases, where obviously different reactions are possible, dimeric and trimeric products have been separated. For example, the dienes, which do not fall within the class of monomeric compounds referred to above, and which yield rubber-like products on polymerization, may undergo reactions of the Diels-Alder type to form cyclic products having little or no tendency to polymerize further. Moreover, certain of the simple olefins have been converted to dimers and trimers under comparatively mild conditions of polymerization, but for the most part these materials are modified further by cracking and rearrangement reactions that lead to products of indefinite composition.

The invention described herein relates to a process whereby polymerizable vinylidene compounds of the general formula

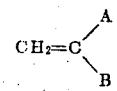

where "A" is hydrogen, an alkyl radical or an aryl radical, and "B" is a radical selected from the group consisting of cyano, acyl, acyloxy, carboalkoxy, and carboaryloxy radicals, can be converted smoothly to the corresponding dimeric, trimeric, and higher molecular weight liquid polymers.

This invention has as an object to provide a method for the conversion of vinylidene compounds of the above type, to novel liquid polymers of relatively low molecular weight when compared to the solid resin-type polymers heretofore produced by conventional methods of polymerization. A further object is to convert said polymerizable compounds predominantly to the corresponding dimers, trimers, tetramers, and the like. A still further object is to provide a method whereby said compounds are converted to the above mentioned low molecular weight liquid polymers while avoiding the formation of high molecular weight solid resinous polymers in any substantial amounts. Other objects will appear hereinafter.

These objects are accomplished by the following invention which comprises heating a vinylidene compound of the aforementioned type in the liquid phase at an elevated temperature of at least 160° C. while in the presence of a polymerization inhibitor. The preferred embodiments of this invention are described in the following examples that illustrate but do not otherwise limit the invention.

Example 1

Two hundred grams of methyl methacrylate is charged into a steel bomb together with 2 grams of hydroquinone. The bomb is flushed with hydrogen, sealed, and heated to a temperature of 225° C. over a period of about 12 hours. The bomb is then cooled rapidly, and from the cold bomb there is recovered 197 grams of amber colored liquid having a substantially higher viscosity than the original methyl methacrylate. Upon fractional distillation of this product there is recovered 80 grams of unchanged monomeric methyl methacrylate, 71.5 grams of a product, B. P. 105°–106° C./5 mm., 28.9 grams of a product, B. P. 155°–158° C./5 mm., and 10 grams of higher boiling material that is liquid at room temperature. The product, B. P. 105°–106° C./5 mm. is dimethyl $\alpha,\alpha'$-dimethyldihydromuconate having the structure

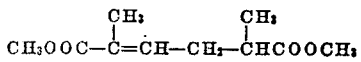

as evidenced by the following series of reactions. Upon hydrogenation at 100° C. in the presence of a nickel catalyst, the dimer absorbs a quantity of hydrogen corresponding to one double bond and is converted to an ester, B. P. 135°–137° C./30 mm. On hydrolysis, this ester is readily converted to the corresponding $\alpha,\alpha'$-dimethyl adipic acid, which comprises a mixture of the racemic and meso isomers, M. P. 118°–125° C. Upon separating the isomers by fractional crystallization from water, the pure racemic form melts at 76° C. and the meso form at 141° C. (cf. Zelinsky, Ber. 24, 3997 (1891)). The compound, B. P. 155°–158° C./5 mm. is the corresponding trimer, which has an empirical composition the same as that of methyl methacrylate and a molecular weight, determined cryoscopically in benzene, of approximately 300.

Example 2

A 150 gram sample of methyl methacrylate containing 20 parts per million by weight of pyrogallol is heated in a bomb under its own vapor pressure at a temperature of 225° C. for a period of about 16 hours. The product obtained is an amber colored, viscous, sticky liquid that on fractional distillation gives 27.3% of unchanged methyl methacrylate monomer, 31.5% of the dimer described in Example 1, and 34.7% of a residue comprising a dark colored tacky jelly. The residue is completely soluble in a small quantity of acetone. Upon dilution of the acetone solution with methanol, solid methyl methacrylate polymer precipitates. After washing thoroughly with methanol and drying, the polymer is a hard, granular substance apparently identical with the methyl methacrylate polymer prepared by conventional methods. The quantity obtained represents 35% by weight of the original distillation residue. Evaporation of the methanol-acetone solution gives an oil that on distillation boils from 130° C./15 mm. to 250° C./15 mm. This liquid product comprises a mixture of low molecular weight polymers of methyl methacrylate ranging from the trimer to the pentamer. The liquid polymers are compatible in all proportions with granular high molecular weight methyl methacrylate polymer to give materials ranging from hard plastics to tacky jellies, depending upon the quantity of liquid polymers employed as plasticizer.

Example 3

A mixture of 175 grams of methyl vinyl ketone and 2.5 grams of hydroquinone is sealed in a bomb and heated at a temperature of 200° C. for a period of 7 to 8 hours. At the end of that period the bomb is cooled and the product removed. The product consists of a viscous orange liquid that on fractional distillation under diminished pressure gives 6% of a product, B. P. 75°–76° C./21 mm., 40% of a product, B. P. 136°–143° C./24 mm., and 8% of a product, B. P. 163°–165° C./21 mm. The compound, B. P. 75°–76° C./21 mm., is apparently the same octene-1-dione-3,7 reported in German Patent 227,176, which is a dimer of methyl vinyl ketone. The fraction, B. P. 136°–143° C./24 mm. appears to be essentially pure trimer. The higher boiling product and residue comprise still higher molecular weight polymers of methyl vinyl ketone, although different in properties from methyl vinyl ketone polymer prepared with peroxide catalysts.

Example 4

A 200 gram sample of methacrylonitrile containing 1% by weight of hydroquinone is treated for a period of 14 hours at 225° C. according to the process of Example 1. Upon cooling the reaction tube, the product is recovered as a dark brown liquid containing some solid sludge. The product is treated with ethyl acetate to separate the solid and liquid parts, and there is obtained a 50% yield of polymethacrylonitrile in the form of a red powder. Distillation of the ethyl acetate fraction gives about 30% of unchanged methacrylonitrile and 14% of a dimeric product, B. P. 128°–130° C./24 mm. The dimer is presumably the nitrile of $\alpha,\alpha'$-dimethyldihydromuconic acid. If this reaction is carried out under the same conditions for a period of 6–8 hours, a lower yield of the dimeric product is obtained, about 75% of the monomer is recovered, and very little solid polymeric product is obtained.

Example 5

A sample of acrylonitrile containing 1.3% of hydroquinone by weight is heated in an autoclave under its own vapor pressure at 200° C. for a period of 7–8 hours. The product so obtained is treated with an excess of ethyl acetate to precipitate powdered polyacrylonitrile resin. Fractional distillation of the ethyl acetate solution gives an oil, B. P. 120°–122° C./5 mm., having the empirical composition of the corresponding dimer. Upon selective hydrogenation of the dimer at the olefin bond there is obtained a saturated nitrile that on hydrolysis gives a dicarboxylic acid that is presumably methyl glutaric acid.

Although in the foregoing examples there have been indicated certain definite conditions of temperature, pressure, reaction times, inhibitor concentrations and the like, it is to be understood that these values may be varied somewhat within the scope of the invention. The process of this invention is carried out at a temperature of at least 160° C. and preferably at temperatures within the range of 200° C. to 225° C. As the polymerization reaction must be carried out in the liquid phase, the upper temperature limit is necessarily the critical temperature of the compound treated. However, it is seldom practicable to operate at temperatures above about 275° C. The minimum operating pressure for a given reaction system is dependent on the vapor pressure of the compound treated at the temperature of the reaction. The minimum operating pressure is therefore the minimum pressure necessary to maintain the compound treated in the liquid phase. In general, for the compounds mentioned in the examples, the minimum pressure will be in the neighborhood of 250-400 lbs./sq. in. With compounds having a higher boiling point, the minimum pressure will be somewhat lower. However, in certain instances it may be desirable to use higher pressures; for example, 1500 lbs./sq. in. Higher pressures in the reaction tube are conveniently obtained by admitting hydrogen or other inert gases under pressure at room temperature. The upper pressure is restricted only by the practical limitations of the equipment used.

If it is desired to direct the reaction so as to obtain particularly high yields of a given liquid polymer, care should be taken to maintain the reaction mixture at the reaction temperature for the proper length of time. For example, in the treatment of methyl methacrylate it has been found that heating for relatively short periods of time leads to the production of the dimer and a relatively small amount of higher molecular weight liquid polymers. This result is obtained during a period of 6 to 8 hours. On the other hand, if the heating is prolonged over a period of 16 to 20 hours, a major part of the product consists of the trimer and higher liquid polymers of methyl methacrylate. Also in obtaining a desired yield of a given liquid polymer, it is important properly to adjust the concentration of the inhibitor used. In general, it has been found that concentrations of active inhibitor as low as 20 parts per million by weight are effective in preventing the formation of substantial amounts of high molecular weight solid polymers. However, in order to obtain a maximum yield of the dimeric product, it is preferable to use inhibitor concentrations of 1 to 2.5% by weight.

As inhibitors for the processes of this invention there may be used any one of the general class of polymerization inhibitors and especially those having antioxidant properties. Among the most effective inhibitor substances are the polyhydric phenols such as pyrogallol, hydroquinone, catechol, and gallic acid. The monohydric phenols, including beta-naphthol, ar-tetrahydro-beta-naphthol, and o-cresol and the like, may also be used but they are somewhat less effective. Sulfur compounds, such as thiodiphenylamine, can be employed, and powdered sulfur is among the best inhibitors for reactions involving formation of low molecular weight polymers. There may also be used certain readily oxidized metals, such as copper, in powdered form provided they neither react with nor decompose the compound treated.

If desired the condensation may be carried out in the presence of inert organic solvents, but for practical reasons it is preferred to operate without a solvent.

It is readily apparent to one skilled in the art that this process for the controlled polymerization of vinylidene compounds having the general formula

where "A" is hydrogen, an alkyl or aryl radical and "B" is a radical selected from the group consisting of cyano, acyl, acyloxy, carboalkoxy, and carboaryloxy radicals, offers many possibilities for the synthesis of new and valuable products. In addition to the materials mentioned in the examples, there may be employed as raw materials higher esters of methacrylic acid, other substituted acrylic acid esters, derivatives of methyl vinyl ketone, and a large number of other compounds coming within the scope of the invention. In general, the products of this invention are of particular interest as chemical intermediates. For example, the dimer of methyl methacrylate can be converted in high yields to dimethyl adipic acid, which is of considerable interest as a resin intermediate, particularly for resins of the alkyd type. The higher liquid polymers of methyl methacrylate are valuable plasticizers for the higher molecular weight solid resin-like polymers produced by conventional methods of polymerization. The dimers of unsaturated nitriles are of interest for hydrogenation to diamines or for conversion to the corresponding dicarboxylic acids. Other uses for the compounds of this invention will be readily apparent to those skilled in the art.

Now having described the preferred embodiments of the invention, it is to be understood that this invention is not to be limited to the specific embodiments thereof except as defined in the following claims.

I claim:

1. The process for the polymerization of monomeric vinylidene compounds of the general formula

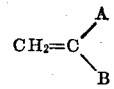

where "A" is selected from the group consisting of hydrogen, and alkyl radicals, and where "B" is a radical selected from the group consisting of cyano, acyl, acyloxy, and carboalkoxy radicals, to produce low molecular weight polymers selected from the class consisting of dimers and trimers which comprises heating said monomeric vinylidene compounds in the liquid phase to a temperature of at least 160° C. while in the presence of a polymerization inhibitor.

2. The process in accordance with claim 1 characterized in that the compound is heated to a temperature between 200° and 225° C.

3. The process in accordance with claim 1 characterized in that the inhibitor is a polyhydric phenol.

4. The process for producing dimeric compounds from monomeric vinylidene compounds of the general formula

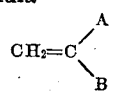

where "A" is selected from the group consisting of hydrogen, and alkyl radicals, and where "B" is a radical selected from the group consisting of cyano, acyl, acyloxy, and carboalkoxy radicals, which comprises heating said monomeric compounds in the liquid phase in the presence of a polymerization inhibitor to a temperature of at least 160° C. for a period of from 6 to 8 hours.

5. The process in accordance with claim 4 characterized in that the polymerization inhibitor is present in an amount of about 1 to about 2.5% by weight of the monomeric compound treated.

6. The process for the polymerization of monomeric methyl methacrylate to produce low molecular weight polymers selected from the class consisting of dimers and trimers, which comprises heating said monomeric methyl methacrylate in the liquid phase to a temperature of at least 160° C. while in the presence of a polymerization inhibitor.

7. The process in accordance with claim 6 characterized in that the monomeric methyl methacrylate is heated to a temperature between 200° and 225° C. and the polymerization inhibitor is a polyhydric phenol present in the amount of about 1 to about 2.5% by weight of the monomeric methyl methacrylate.

8. The process for the polymerization of monomeric methacrylonitrile to produce low molecular weight polymers selected from the class consisting of dimers and trimers, which comprises heating said monomeric methacrylonitrile in the liquid phase to a temperature of at least 160° C. while in the presence of a polymerization inhibitor.

9. The process in accordance with claim 8 characterized in that the monomeric methacrylonitrile is heated to a temperature between 200° and 225° C. and the polymerization inhibitor is a polyhydric phenol present in the amount of about 1 to about 2.5% by weight of the monomeric methacrylonitrile.

10. The process for the polymerization of monomeric methyl vinyl ketone to produce low molecular weight polymers selected from the class consisting of dimers and trimers, which comprises heating said monomeric methyl vinyl ketone in the liquid phase to a temperature of at least 160° C. while in the presence of a polymerization inhibitor.

11. The process in accordance with claim 10 characterized in that the monomeric methyl vinyl ketone is heated to a temperature between 200° and 225° C. and the polymerization inhibitor is a polyhydric phenol present in the amount of about 1 to about 2.5% by weight of the monomeric methyl vinyl ketone.

BENJAMIN W. HOWK.